(12) United States Patent
Brealey et al.

(10) Patent No.: US 10,671,368 B2
(45) Date of Patent: Jun. 2, 2020

(54) AUTOMATIC CREATION OF DELIVERY PIPELINES

(71) Applicant: International Business Machines Corporation, Armonk, NY (US)

(72) Inventors: Christopher L. Brealey, Markham (CA); Simon Helsen, Komoka (CA); Thomas C. Schmidt, North York (CA); Christopher N. Taylor, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 15/802,516

(22) Filed: Nov. 3, 2017

(65) Prior Publication Data

US 2019/0138288 A1    May 9, 2019

(51) Int. Cl.
*G06F 8/65*     (2018.01)
*G06F 8/71*     (2018.01)
(Continued)

(52) U.S. Cl.
CPC ............. *G06F 8/65* (2013.01); *G06F 8/71* (2013.01); *G06F 8/77* (2013.01); *G06F 11/3688* (2013.01);
(Continued)

(58) Field of Classification Search
CPC ..... G06F 8/60; G06F 8/61; G06F 8/65; G06F 8/70; G06F 8/71; G06F 8/77;
(Continued)

(56) References Cited

U.S. PATENT DOCUMENTS

| 8,752,030 B1 * | 6/2014 | Chen | ................ | G06Q 10/0633 717/135 |
| 9,021,458 B1 * | 4/2015 | Jacob | ...................... | G06F 8/65 717/168 |

(Continued)

FOREIGN PATENT DOCUMENTS

EP         3336688 A1 *   6/2018   ............... G06F 8/77

OTHER PUBLICATIONS

F. Oliveira et al., "Delivering software with agility and quality in a cloud environment," in IBM Journal of Research and Development, vol. 60, No. 2-3, pp. 10:1-10:11, Mar.-May 2016. (Year: 2016).*

(Continued)

*Primary Examiner* — Andrew M. Lyons
(74) *Attorney, Agent, or Firm* — Heslin Rothenberg Farley & Mesiti P.C.; Michael Petrocelli, Esq.

(57) ABSTRACT

A method, computer program product, and system includes a processor(s) identifying one or more resources of a shared computing environment utilized in delivery of an application, to users of the shared computing environment. The processor(s) monitors communications to the one or more resources, to identify and intercept operations related to delivery of the application. The processor(s) analyze the intercepted operations, to determine when the operations comprise a pattern occurring with a frequency indicative of a predetermined level of confidence, where the pattern comprises one or more delivery operations. Based on determining the pattern occurs with the frequency, the processor(s) generates an automated delivery pipeline for the application, where the automated delivery pipeline automates at least one of the one or more delivery operations comprising the pattern. The processor(s) utilizes the automated delivery pipeline to deliver a new version of the application.

14 Claims, 5 Drawing Sheets

(51) Int. Cl.
*G06F 8/77* (2018.01)
*G06F 11/36* (2006.01)
*H04L 12/24* (2006.01)
*G06F 8/60* (2018.01)

(52) U.S. Cl.
CPC ............ *G06F 8/60* (2013.01); *G06F 11/3664* (2013.01); *H04L 41/5054* (2013.01)

(58) Field of Classification Search
CPC ............ G06F 11/3664; G06F 11/3668; G06F 11/3672; G06F 11/3688; G06F 11/3692; G06F 11/3696; G06F 8/62; G06F 8/656; G06F 8/658; G06F 11/30; G06F 11/3003; G06F 11/3006; G06F 11/301; G06F 11/302; G06F 11/3058; G06F 11/3072; G06F 11/34; G06F 11/3404; G06F 11/3409; G06F 11/3438; G06F 11/3442; H04L 41/5054
USPC .................................................. 717/168–178
See application file for complete search history.

(56) References Cited

U.S. PATENT DOCUMENTS

| | | | | |
|---|---|---|---|---|
| 9,317,311 | B2* | 4/2016 | Anderson | G06F 9/45533 |
| 9,497,136 | B1* | 11/2016 | Ramarao | G06F 9/45558 |
| 9,645,807 | B2* | 5/2017 | Balasubramanian | G06F 8/61 |
| 9,965,377 | B1* | 5/2018 | Russell | G06F 11/3684 |
| 10,120,668 | B2* | 11/2018 | Palavalli | G06F 9/5077 |
| 10,146,524 | B1* | 12/2018 | Killmon | G06F 8/65 |
| 10,157,044 | B2* | 12/2018 | Khazanchi | G06F 8/20 |
| 10,235,166 | B1* | 3/2019 | Barnard | G06F 8/77 |
| 2006/0206864 | A1* | 9/2006 | Shenfield | G06F 8/20 717/107 |
| 2007/0038492 | A1* | 2/2007 | Ryan | G06F 8/10 705/7.26 |
| 2008/0244600 | A1* | 10/2008 | Wong | G06F 9/5083 718/104 |
| 2014/0282353 | A1 | 9/2014 | Jubran et al. | |
| 2015/0052501 | A1* | 2/2015 | Shani | G06F 11/3688 717/124 |
| 2015/0244773 | A1* | 8/2015 | Wang | H04L 67/10 709/201 |
| 2015/0324182 | A1* | 11/2015 | Barros | G06F 8/61 717/174 |
| 2015/0378717 | A1* | 12/2015 | Jacob | G06F 8/65 717/124 |
| 2016/0034380 | A1* | 2/2016 | Shani | G06F 11/3636 717/172 |
| 2016/0142338 | A1* | 5/2016 | Steinder | H04L 41/0813 709/226 |
| 2016/0366246 | A1* | 12/2016 | Battle | H04L 67/327 |
| 2017/0003948 | A1 | 1/2017 | Iyer et al. | |
| 2017/0177324 | A1* | 6/2017 | Frank | G06F 16/173 |
| 2017/0180459 | A1* | 6/2017 | Frank | H04L 67/10 |
| 2017/0180487 | A1* | 6/2017 | Frank | H04L 67/16 |
| 2017/0255460 | A1* | 9/2017 | Frank | H04L 67/16 |
| 2017/0262298 | A1* | 9/2017 | Frank | G06F 16/173 |
| 2017/0269921 | A1* | 9/2017 | Martin Vicente | G06F 8/65 |
| 2017/0371636 | A1* | 12/2017 | Palavalli | G06F 9/5077 |
| 2018/0136951 | A1* | 5/2018 | Palavalli | G06F 9/44505 |
| 2018/0173502 | A1* | 6/2018 | Biskup | G06F 8/30 |
| 2018/0329738 | A1* | 11/2018 | Kasha | G06F 8/71 |
| 2018/0349257 | A1* | 12/2018 | Bhattacharjee | G06F 11/3688 |
| 2019/0129701 | A1* | 5/2019 | Hawrylo | G06F 8/61 |
| 2019/0129712 | A1* | 5/2019 | Hawrylo | G06F 8/70 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.
Continuous Integration Best Practices: Vision and Reality—Electric Cloud, http://electric-cloud.com/plugins/continuous-integration/, 13 pages, Jun. 7, 2017.
Triggering Builds—Atlassian Documentation, http://confluence.atlassian.com/bamboo/triggering-builds-289276897.html, 3 pages, Jun. 7, 2017.

* cited by examiner

AUTOMATIC CREATION OF DELIVERY PIPELINES

BACKGROUND

Software development and deployment is increasingly managed in distributed and shared computing environments, including but not limited to, cloud computing environments. A strategy for software delivery is referred to as Continuous Delivery (CD), which is a strategy that enables organizations to deliver new features to users as fast and efficiently as possible. The CD pipeline, also referred to generally as a delivery pipeline, breaks down the software delivery process into stages (e.g., building the software, testing the software, and deploying the software). The delivery pipeline refers to the stages of development, testing, building, etc., related to deployment of new features, which occur before the first usage of the new features. A delivery pipeline is utilized to deploy program code to a destination at which it may be accessed by end users, before the deployed code is accessed by an end user.

Thus, newer versions of software can be deployed to a community of users by deploying program code through a delivery pipeline to a server in this computing environment and providing access to various users by enabling the users to access the server-based application runtime in the environment.

SUMMARY

Shortcomings of the prior art are overcome and additional advantages are provided through the provision of a method for generating a delivery pipeline. The method includes, for instance: identifying, by one or more processors, one or more resources of a shared computing environment utilized in delivery of an application, to users of the shared computing environment; monitoring, by the one or more processors, communications to the one or more resources, to identify and intercept operations related to delivery of the application; analyzing, by the one or more processors, the intercepted operations, to determine when the operations comprise a pattern occurring with a frequency indicative of a predetermined level of confidence, wherein the pattern comprises one or more delivery operations; based on determining the pattern occurs with the frequency, generating, by the one or more processors, an automated delivery pipeline for the application, wherein the automated delivery pipeline automates at least one of the one or more delivery operations comprising the pattern; and utilizing, by the one or more processors, the automated delivery pipeline to deliver a new version of the application.

Shortcomings of the prior art are overcome and additional advantages are provided through the provision of a computer program product for generating a delivery pipeline. The computer program product comprises a storage medium readable by a processing circuit and storing instructions for execution by the processing circuit for performing a method. The method includes, for instance: identifying, by one or more processors, one or more resources of a shared computing environment utilized in delivery of an application, to users of the shared computing environment; monitoring, by the one or more processors, communications to the one or more resources, to identify and intercept operations related to delivery of the application; analyzing, by the one or more processors, the intercepted operations, to determine when the operations comprise a pattern occurring with a frequency indicative of a predetermined level of confidence, wherein the pattern comprises one or more delivery operations; based on determining the pattern occurs with the frequency, generating, by the one or more processors, an automated delivery pipeline for the application, wherein the automated delivery pipeline automates at least one of the one or more delivery operations comprising the pattern; and utilizing, by the one or more processors, the automated delivery pipeline to deliver a new version of the application.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals may refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 3:
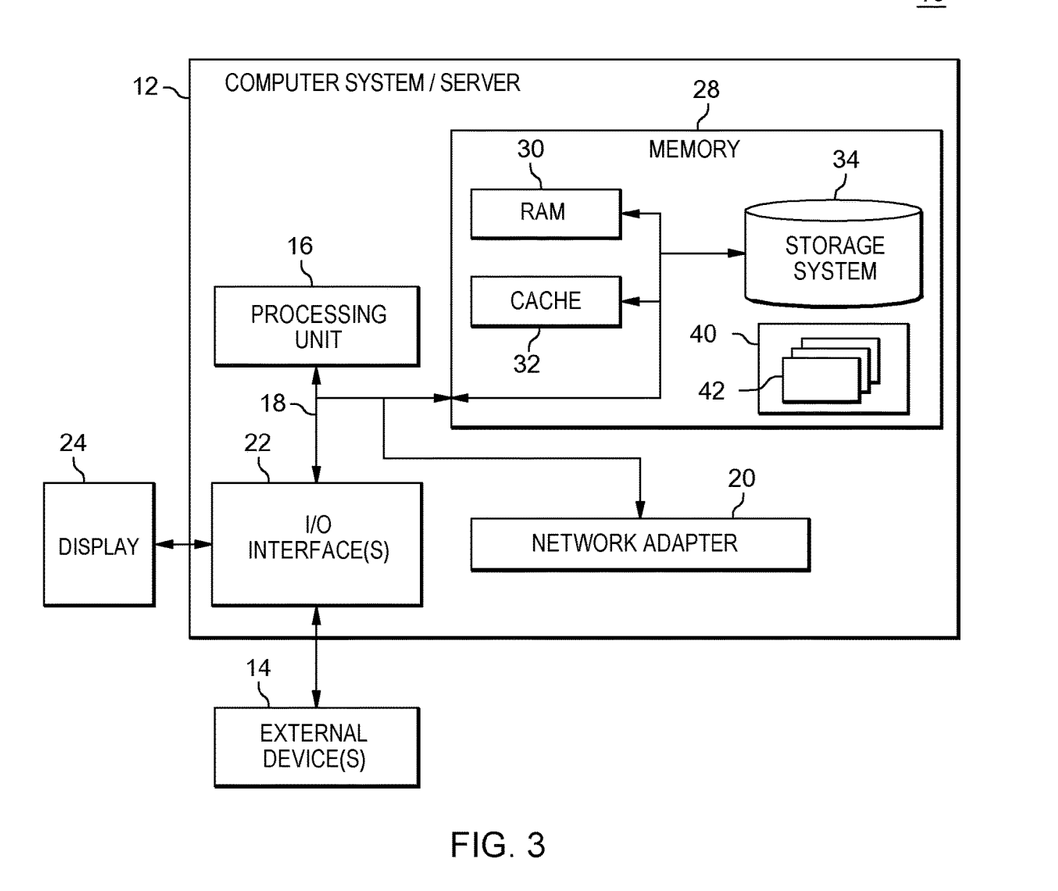
FIG. 3 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 3 as program/utility 40, having a set (at least one) of program modules 42, may be stored in memory 28.

Continuous delivery of software and/or utilization of an automated delivery pipeline refers to providing efficient, automated, repeatable, and predictable delivery of software applications in a shared computing environment, including but not limited to, distributed computing environments, such as cloud computing environments. Traditional software delivery pipelines can be broken down into three stages: 1)

build automation and continuous integration; 2) test automation; and 3) deployment automation. During each stage, one or more programs executed by a resource of the computing environment verifies the quality of new features in order to validate the new functionality and prevent errors from affecting utility, from a user perspective. Automating various stages of the software delivery pipeline increases efficiency and mitigates errors affecting performance and user experience. When software solutions are deployed via a shared computing environment, certain steps within the pipeline are sometimes performed manually, including commands to build, test, and deploy an application. If the deployment is to a small group of individuals or of a limited use solution, individuals may repeatedly utilize an ad-hoc process with manual steps in the deployment. Although the underlying software may serve the needs of a limited group of individuals in the short term, utilizing ad-hoc and manual steps in a deployment it can lead to future issues with consistency, for example, when updates are needed and the pipeline process was both manual and non-repeatable. Should the need for the software solution expand beyond a small group (which is generally a goal in all deployments), the manual and non-repeatable nature of the process can be a detriment to deploying a stable version. Additionally, as the perceived effort of configuring a delivery pipeline rises exponentially, the motivation to automate may decline, resulting in person-hours wasted performing manual actions or addressing human error, and/or resulting in deployment of low quality or unstable software versions.

Embodiments of the present invention include computer-implemented methods, computer program products, and computer systems, include one or more programs executing on at least one processing resource that analyze software delivery actions over a period of time. These actions may include, but are not limited to: build, deploy, and test actions. In some embodiments of the present invention, one or more programs analyze additional actions related to software delivery, including, but not limited to, gates (i.e., operations that approve or block progress to the next operation in the delivery of the software, usually based upon analysis of quality metrics), translation of human readable strings into other languages, and/or license and code pedigree scanning. The one or more programs detect patterns in the sequencing and timing of these actions, and generate a delivery pipeline, based on pattern analysis.

In embodiments of the present invention, one or more programs executing on at least one processing resource automatically create software delivery pipelines, and these programs and/or additional programs utilize these pipelines to deploy the software automatically, in a shared computing environment (e.g., a cloud computing environment) where users access the software as a service. To generate the pipeline, and therefore automate a portion of a deployment process (or the entirety of the process), in some embodiments of the present invention, one or more programs intercept operations related to the collaborative creation of a software solution by monitoring activities, including but not limited to, use of a source code repository to collaborate on a code base, execution of tests against the code, and periodic deployments of the code. Based on these operations, the one or more programs generate a profile describing the series of operations. The profile includes temporal information associated with pushes to the source code repository relative to deployment and test activities. The one or more programs determine when processes in the software delivery process in the shared computing environment are being executed manually and repetitively. To make this determination, the one or more programs continuously collect information related to the series of operations and upon reaching a predetermined level of confidence, the one or more programs determine (based on reaching this level of confidence), that a repetitive process is being manually executed in order to deploy the software. The one or more programs evaluate (and update) this confidence level based on observing a given number of instances of a pattern comprising a code push, followed by a deployment, of the pushed code. Based on determining that a portion of the software deployment is manual and repetitive (e.g., reaching the level of confidence), the one or more programs configure a delivery pipeline that triggers a deployment of the evaluated software when changes to the code repository are consistent with the observed pattern of change, followed by deployment of the code. Thus, the one or more programs automate the deployment to comport with the previously manual steps. In some embodiments of the present invention, the one or more programs recommend this delivery pipeline, rather than implementing it automatically.

By generating delivery pipelines, embodiments of the present invention provide benefits over existing systems that orchestrate functionalities related to delivery pipelines. Some existing technologies assign approvers to source code and by integrating approving or rejecting code changes into this process, gate subsequent progress in delivery thus controlling progress through an existing delivery pipeline. Embodiments of the present invention can work in concert with existing solutions related to CD. For example, certain existing systems include one or more programs that observe/monitor code changes, builds, deployments, and test actions, related to software, whether driven manually or by automated processes, over time, and identify recurring patterns of execution of such actions to generate a delivery a pipeline that replicates and/or approximates the patterns detected. Other existing technologies determine a likelihood of a successful deployment, based on analyzing metrics, including the amount of code changed, the number of tests passed or failed, and/or number of build attempts. Based on this prediction of success, this existing system could enable or block a deployment. One or more programs in embodiments of the present invention can be integrated with this existing system, which analyzes code changes, test results, build attempt results, etc., and estimate success of a deployment, because the one or more programs analyze concrete actions (e.g., code change commits, initiation of tests, and deployment of applications) to generate a pipeline that automates portions of these concrete actions. Embodiments of the present invention potentially provide additional functionality when integrated with existing system because in embodiments of the present invention, one or more programs generate pipelines that include jobs or tasks that analyze build/test/deploy metrics and gate progress through the balance of the pipelines in accordance with this analysis. Certain existing systems may seek to automate certain items related to delivery of software, such as triggering a build in response to an event, such as a code change or a time of day. Embodiments of the present invention do not directly drive software delivery, but instead, generate pipelines configured to monitor for events, trigger builds, deploy code, run tests, and gate progress.

Aspects of embodiments of the present invention represent improvements to existing computing technology and are inextricably tied to computing. Embodiments of the present invention include one or more programs that generate deployment pipelines in shared computing environments. Consistent software deployment in these environments can be particularly challenging and lead to the integration of many manual steps, which introduce errors. Thus, embodiments of the present invention provide specific improvements realized in these shared computing environments by automatically generating deployment pipelines that provide consistent deployments of source code to users of the shared computing environment. In order to provide this pipeline, in embodiments of the present invention, one or more programs determine usage of shared computing resources by multiple users engaged in development, testing, and deployment of software as a service, and recommend (describe) or generate a preconfigured delivery pipeline when certain criteria are met. In some embodiments of the present invention, the recommendation generated by one or more programs is a guide to configuration of a pipeline that can be automatically implemented once electronically communicated to one or more programs. In embodiments of the present invention, one or more programs generate this pipeline without configuring various resources in advance and also avoid issues introduced through manual processes.

Figure 1:
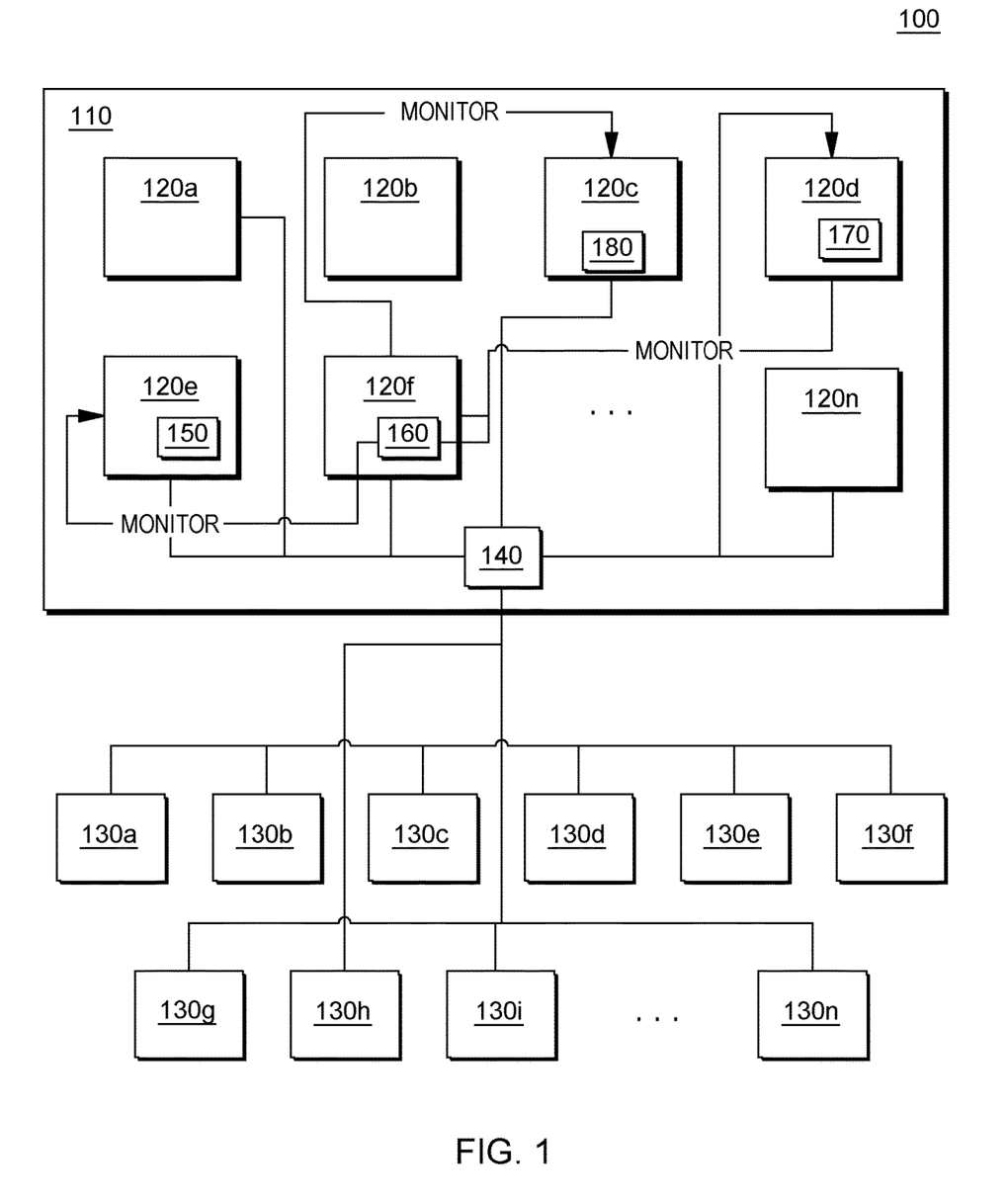
FIG. 1 is an illustration of various aspects of the present invention implemented in a technical environment.

FIG. 1 is a technical environment 100 in which various aspects of the present invention may be implemented. For the sake of this illustration, certain processes and programs are depicted as being executed by certain (single) resources. As understood by one or skill in the art, various functions are separated for clarity, not because of technical limitations. Thus, shared computing environment 100 provides one (non-limiting) example of the functionality of embodiments of the present invention.

The shared computing environment 110 of FIG. 1 may include one or more cloud computing environment (e.g., public, private, hybrid, etc.). The computing nodes 120a-120n comprising the shared computing environment 110 may be physical machine, virtual machines, and/or containers. The computing nodes 120a-120n may be distributed across multiple clouds, or may not be cloud resources. Certain of the computing nodes 120a-120n may be operated by third parties and utilized to perform functionality including, but not limited to remote testing and/or remote analytics, related to the resources.

Shared computing environment 110, which can be a cloud computing environment, is a computing environment that provides access to computing resources 120a-120n which can be utilized for developing, building, testing, and deploying, applications to users accessing the shared computing environment 110 via various computing nodes 130a-130n, over various network connections. The computing resources 120a-120n of the shared computing environment 110 may comprise one or more actual and/or virtual machines. In this particular environment 100, which includes merely one example of a shared computing environment 110, a gateway node 140, is utilized as a pass-through in order to enable the various computing nodes 130a-130n to access one or more of the computing resources 120a-120n.

To develop, test, and deploy applications accessible by connecting to the computing environment 110, users could utilize the computing resources 120c-120e of the shared computing environment 110. In this example, users utilize computing resources 120c-120e to build, test, and deploy a first application 150.

In embodiments of the present invention, one or more programs 160 executed by at least one processing resource (e.g., of computing resource 120f) of the shared computing environment 110 monitor actions related to the first application 150, including building, testing, and deploying, the application on computing resources 120d-120e. The one or more programs 160 continuously monitor these activities, over time, within the shared computing environment 110 and generate patterns that indicate a continuous delivery effort. Based these patterns, the one or more programs 160 derive a formal continuous delivery pipeline definition; the one or more programs 160 identify repetitive manual actions. The one or more programs 160 utilize this definition to automate the manual actions by generating a deployment pipeline. The one or more programs 160 work continuously to generate and update the definition. For example, to monitor activity related to application 150, in this example, the one or more programs 160 monitor (or intercept) activities related to building, testing, and deploying the first application 150 on computing resources 120d-120e. The one or more programs 160 also monitor both before and after deployments related to the first application 150, programs that perform builds, run tests, analysis quality metrics, and similar actions related to the first application 150, both before and after changes are pushed to a source code repository 170.

In FIG. 1, the computing resources 120c-120e that are utilized in the development, testing, and deployment of the first application 150, include various sub-resources. For example, in order to determine what actions are being taken related to the source code, and in order to develop source code for the first application 150, the computing resources 120c-120e include a source code repository 170. The one or more programs 160 intercept and/or monitor actions related to the source code repository 170 when analyzing activities and identifying patterns that may comprise repetitive manual actions that the one or more programs 160 may integrate into a deployment pipeline. Patterns identified by one or more programs in embodiments of the present invention may include identifying one or more correlations between updates to source code (e.g., commits to a repository 170) and actions that follow, including build, testing, analysis, and deployment. In order to monitor actions related to the source code repository 170, the one or more programs monitor programs 180 that perform builds, run tests, analysis quality metrics, and similar actions related to the first application 150, both before and after changes are pushed to a source code repository 170.

Developers of the first application 150 utilize the source code repository 170 to collaborate on a code base to periodically perform deployments to a computing resource. Collaborations on the code based include implementing changes to the source repository 170, such as performing builds and tests. The deployments of the first application 150 may be targeted to certain computer resources within the shared computing environment 110. In FIG. 1, new versions of the first application 150 are deployed to a specific computing resource 120e.

In some embodiments of the present invention, the one or more programs 160 intercept actions related to this collaboration and to the deployments to produce a profile. Thus, to monitor/intercept these activities as related to the first application 150, the one or more programs 160 monitor/intercept activities executed on the computing resource 120d that houses the source code repository 170, the computing resource 120e to which the first application 150 is deployed, and computing resource 120c, which executes programs that build, test, analyze, and/or take other arbitrary actions related to the delivery of software changes in the first application 150 to its ultimate destination (i.e., computing resource 120e). The profile may capture the temporal aspects of the development cycle, including but not limited to, when pushes to the code repository occur relative to deployment activities. The one or more programs 160 determine the consistency of the profile and based on the profile being consistent over a period of time, derive a formal continuous delivery pipeline definition utilizing the profile.

In some embodiments of the present invention, the one or more programs 160 continue data collection (monitoring/intercepting actions related to development, deployment, and testing of the first application 160) until the one or more programs 160 reach a pre-defined level of confidence that among the monitored actions is a repetitive process that is being manually executed. In some embodiments of the present invention, the confidence level is tied to the number of instances of the observed pattern. An example of a pattern could be a code push of a given code package followed by a deployment of the code in the code package.

In one example, an automated delivery pipeline generated by the one or more programs 160 triggers deployment following the changes made to code in the code repository 170. The one or more programs 160 generate this automated delivery pipeline based on determining, within a level of confidence, that, in the development process related to the first application 150, a code push of a given code package is followed by a deployment of the code in the code package.

In some embodiments of the present invention, the one or more programs 160 generate an automated delivery pipeline by creating a configuration file (e.g., a Terraform file), and directing a pipeline creation technology (e.g., Jenkins, Travis CI, Circle CI, and UrbanCode Deploy) to generate a representation of a delivery pipeline. In an embodiment of the present invention, the one or more programs 160 generate a delivery pipeline that is triggered by changes to the source code repository automatically deploys the code to the location that was manually targeted (e.g., computing resource 120e).

In some embodiments of the present invention, even after generating a delivery pipeline, the one or more programs 160 monitor actions related to the first application 150 (e.g., processes 180 executed on computing resource 120c) and identify additional manual processes in order to implement improvements to the delivery pipeline.

In some embodiments of the present invention, rather than automatically implement a delivery pipeline or automatically update an existing delivery pipeline, the one or more programs 160 alert users involved in the development, deployment, and testing of the first application 150 of a possible automated delivery pipeline, based on analyzing the activity data collected, over time. For example, the one or more programs 160 may determine that instructions for development, testing, and deployment activities related to the first application 150 originate from certain of the computing nodes 130a-130n accessing the specific computing resources 120c-120e that are utilized to develop, test, and deploy the first application 150. For example, the one or more programs 160 may determine that the actions related to the first application 150 originate from two computing nodes 130a-130b of the computing nodes 130a-130n accessing resources in the shared computing environment 110. Based on making this determination, upon recognizing a pattern within a certain degree of confidence, the one or more programs 160 may alert relevant users via their computing nodes 130a-130b of a possible automatic delivery pipeline that could replace the one or more manual activities identified by the one or more programs 160. Based on a user of one or more of the computing nodes 130a-130b accepting the recommendation, the one or more programs 160 may generate the delivery pipeline, including by creating a configuration file (e.g., a Terraform file), and directing a pipeline creation technology (e.g., Jenkins, Travis CI, Circle CI, and UrbanCode Deploy) to generate a delivery pipeline.

In some embodiments of the present invention, the one or more programs may determine which users of the shared computing environment are involved in a given application development effort because those users provide that information to a resource of the shared computing environment in advance of embarking upon developing the application. Using FIG. 1 as an example, in some embodiments of the present invention, one or more users may subscribe to the shared computing environment 110 for the purpose of collaboratively developing the first application 150. Based on subscribing, the one or more programs 160 may allocate and/or receive a notification of an allocation, of computing resources 120c-120e, a source code repository 170, and an indication that the first application 150 should be deployed to a specific computing resource 120e. Upon subscription, the users may provide information regarding notification preferences. Thus, when the one or more programs 160 determine that these users are employing a manual process repeatedly, the one or more programs 160 can access the notification preferences and notify these users of a recommended delivery pipeline, which automates the manual activity, by utilizing these preferences.

Figure 2:
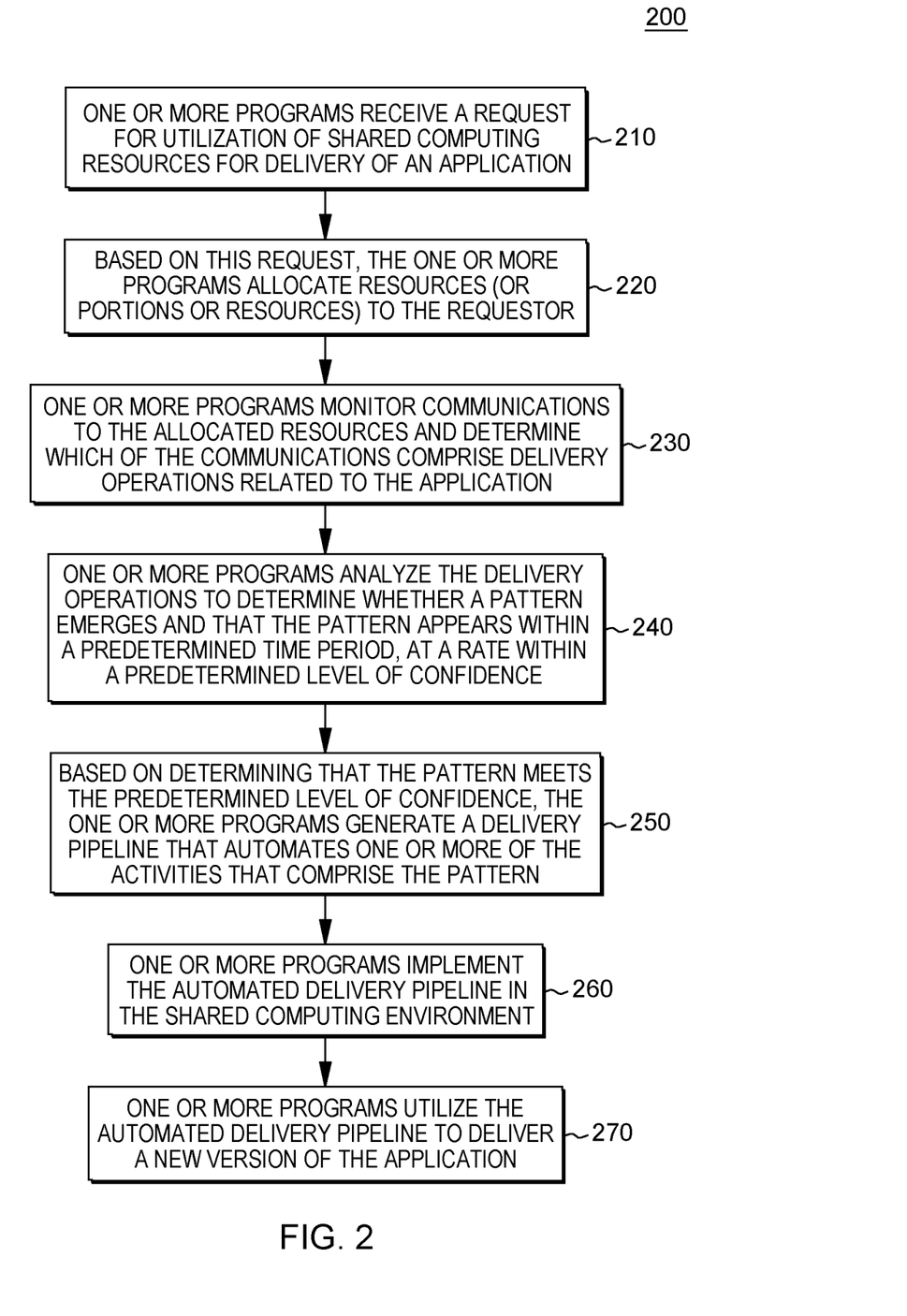
FIG. 2 is a workflow illustrating certain aspects of an embodiment of the present invention.

FIG. 2 is a workflow 200 illustrating certain aspects of various embodiments of the present invention. In some embodiments of the present invention, one or more programs executed by one or more processing resources in a shared computing environment, including but not limited to a cloud computing environment, receive a request for utilization of shared computing resources for delivery of an application (210). Activities relevant to delivery of an application, for which these resources will be utilized, may include development of source code, testing of source code, and deployment of source code. Based on this request, the one or more programs allocate resources (or portions or resources) to the requestor (220). The allocation may include a source code repository and/or a target resource for deployment of the application.

The one or more programs monitor communications to the allocated resources and determine which of the communications comprise delivery operations related to the application (230). To make this determination, the one or more programs may intercept communications between the requestor and the allocated resources, and analyze these communications. Delivery operations may include development operations, testing operations, and/or deployment operations. Operations may include any actions taken on the code repository that comprises collaborating on the code base of the application. In some embodiments of the present invention, the one or more programs intercept and analyze operations on the source code repository.

Based on identifying the delivery operations, the one or more programs analyze the delivery operations to determine whether a pattern emerges and the pattern appears within a predetermined time period at a rate within a predetermined level of confidence (240). For example, the one or more programs may analyze collected operations over four days and determine that each time the code in the code repository is updated "n" times, the code is subsequently deployed. Based on determining that this pattern occurs at least six times over the course of four days, the one or more programs assign this pattern the predetermined level of confidence. In some embodiments of the present invention, a pattern may indicate a repetition of certain activities before deployment of new code, for example, after a specific update is performed on the code base, the application is deployed (with the updated code).

Based on determining the pattern meets the predetermined level of confidence, the one or more programs generate a delivery pipeline that automates one or more of the activities that comprise the pattern (250). In an embodiment of the present invention, by recognizing the pattern, the one or more programs have determined that a repeated manual activity is part of the delivery operations related to the application. By generating the automated delivery pipeline, the one or more programs automate portions of the delivery operations that can be automated. For example, the one or more programs determine that upon implementing ten (10) changes to the source code in the source code repository, the users developing the application, initiate an operation to manually deploy a new version of the application, which includes this updated source code. Thus, in this example, the automated delivery pipeline generated by the one or more programs in this example would automatically deploy a new version of the application to the target deployment resource upon the completion of ten (10) changes to the source code. In another embodiment of the present invention, rather than generate and implement the pipeline, the one or more programs may notify the requestor of the recommended pipeline and based on the acceptance of the requestor of the recommendation, implement the pipeline. In some embodiments of the present invention, the one or more programs may generate the pipeline by creating a configuration file (e.g., a Terraform file), and directing a pipeline creation technology (e.g., Jenkins, Travis CI, Circle CI, and UrbanCode Deploy) to generate a delivery pipeline.

In some embodiments of the present invention, the one or more programs implement the automated delivery pipeline in the shared computing environment (260). The one or more programs utilize the automated delivery pipeline to deliver a new version of the application (270). Delivery of a new version of the application utilizing the delivery pipeline may include building, testing, analyzing, deploying, and/or otherwise executing a step in delivery to an end user of the application.

Referring now to FIG. 3, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computing resources 120*a*-120*n* (FIG. 1) can all be understood as one or more cloud computing nodes 10 (FIG. 3) and if not examples of a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Embodiments of the present invention include a computer-implemented method, a computer system, and a computer program product that include one or more programs executed by one or more processors that identify one or more resources of a shared computing environment utilized in delivery of an application, to users of the shared computing environment. The one or more programs monitor communications to the one or more resources, to identify and intercept operations related to delivery of the application. The one or more programs analyze the intercepted operations, to determine when the operations comprise a pattern occurring with a frequency indicative of a predetermined level of confidence, wherein the pattern comprises one or more delivery operations. Based on determining the pattern occurs with the frequency, generating, by the one or more processors, an automated delivery pipeline for the application, where the automated delivery pipeline automates at least one of the one or more delivery operations comprising the pattern. The one or more programs utilize the automated delivery pipeline to deliver a new version of the application.

In some embodiments of the present invention, deploying the new version of the application includes making the new version of the application available, as a service, to one or more users of the shared computing environment.

In some embodiments of the present invention, the one or more resources of the shared computing environment are selected from a group consisting of: physical machines, virtual machines, and containers.

In some embodiments of the present invention, to identify the one or more resources of a shared computing environment utilized in delivery of the application comprises, one or more programs obtain a request for an allocation of at least one resource for delivery of the application. Based on the request, the one or more programs allocate the one or more resources to the requestor.

In some embodiments of the present invention, the operations related to the delivery of the application are selected from the group consisting of: development operations, testing operations, and deployment operations.

In some embodiments of the present invention, the one or more resources include a source code repository.

In some embodiments of the present invention, the monitoring includes monitoring the source code repository.

In some embodiments of the present invention, where generating the automated delivery pipeline includes one or more programs generating a configuration file and utilizing the configuration file to generate the automated delivery pipeline.

In some embodiments of the present invention, the delivery operations including the pattern include operations triggered by manual commands.

In some embodiments of the present invention, the pattern includes a predetermined number of updates to source code of the application and a command to deploy the applications with the updated source code.

As shown in FIG. 3, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Containers-as-a-Service: the capability provided to the consumer in which consumers can provision containers (e.g., Docker) and clusters of containers (e.g., Kubernetes) with control over the applications on the containers, networking, storage, etc., but not the operating system.

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
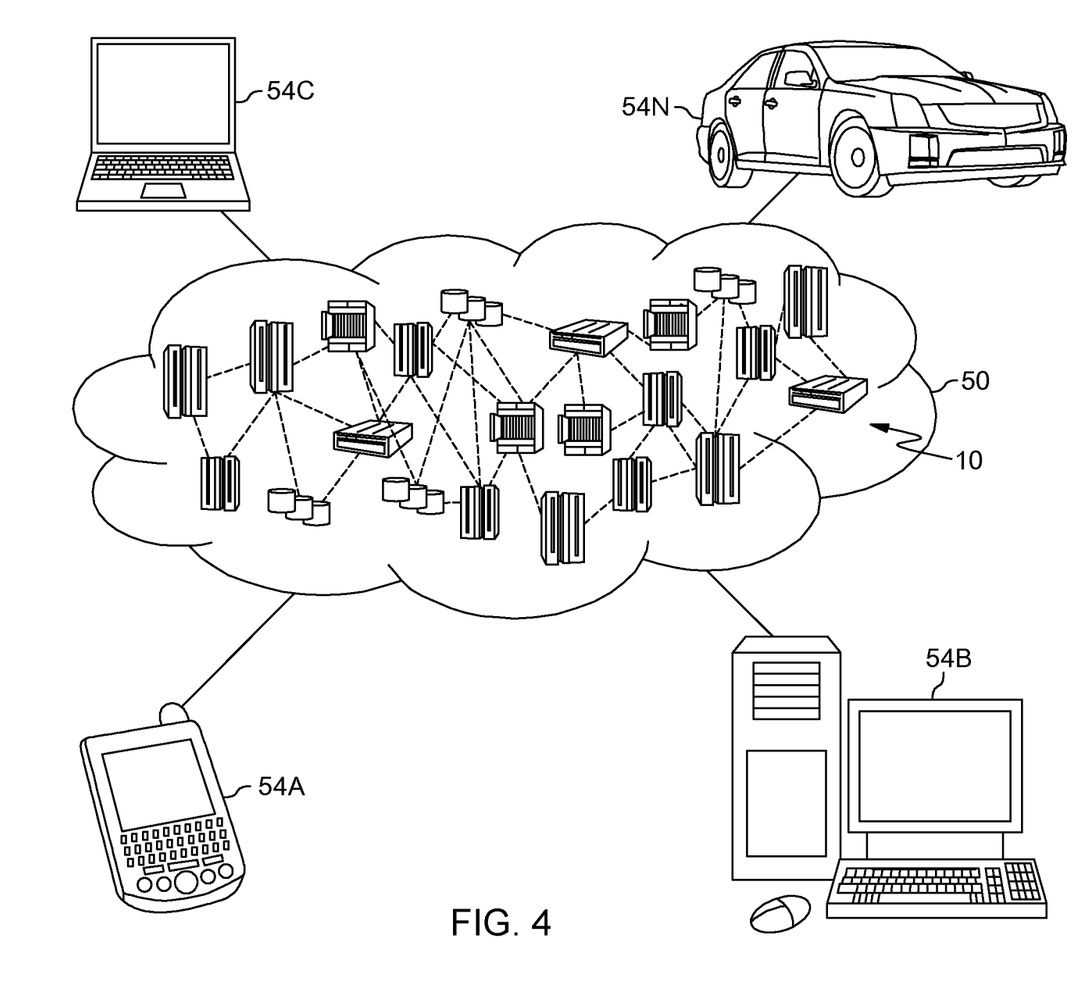
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
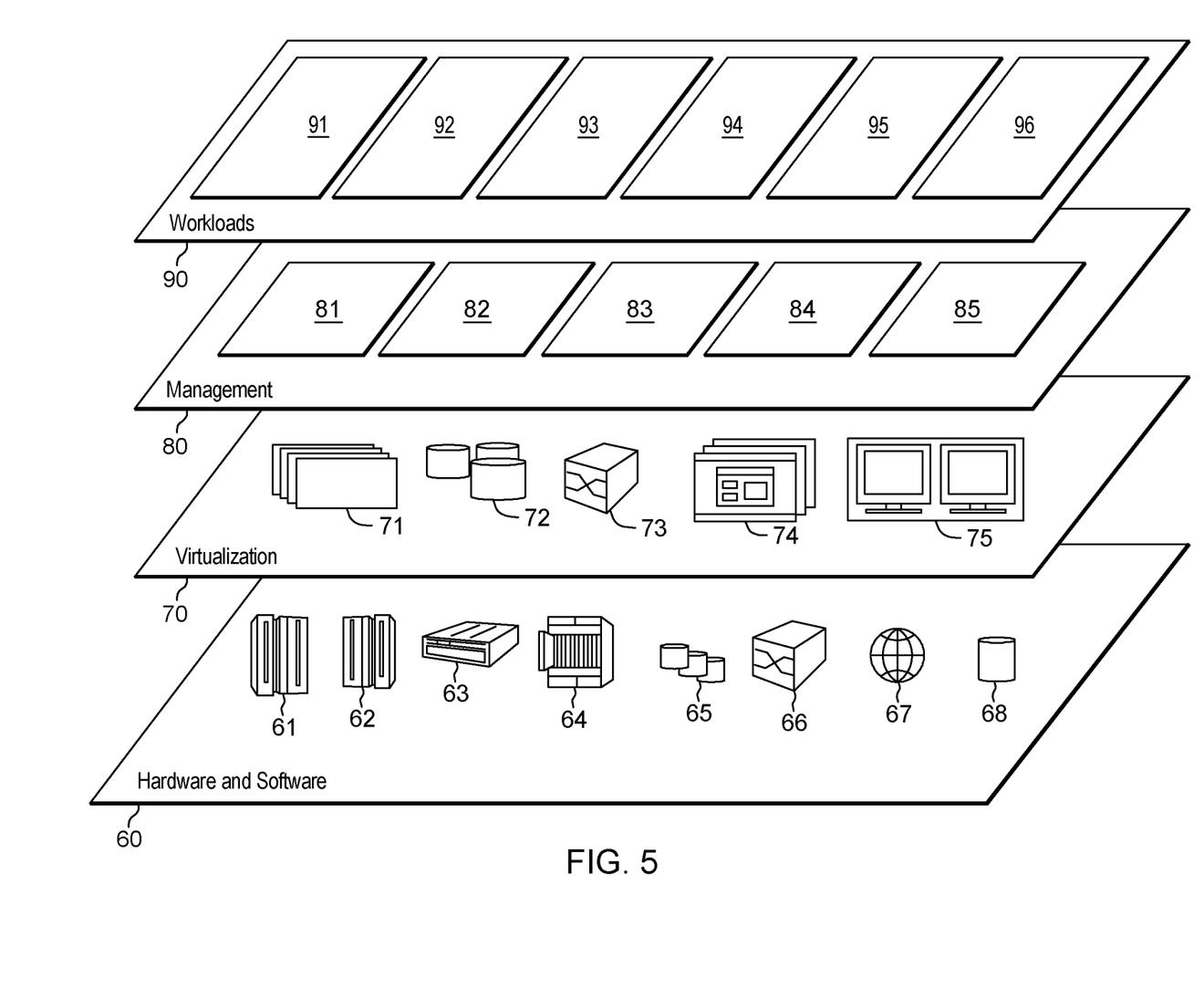
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating an automated delivery pipeline 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
identifying, by one or more processors, one or more resources of a shared computing environment utilized in delivery of an application, to users of the shared computing environment, wherein the one or more resources comprise a source code repository;
monitoring, by the one or more processors, communications to the one or more resources, to identify and intercept operations related to delivery of the application;
analyzing, by the one or more processors, the intercepted operations, to determine when the operations comprise a pattern occurring with a frequency indicative of a predetermined level of confidence, wherein the pattern comprises one or more manual tasks performed by a user of the source code repository comprising source code for the application, wherein the repetitive manual tasks are selected from the group consisting of: building the application, testing the application, and deploying the application, wherein a final repetitive manual task of the repetitive manual tasks comprising the pattern is a command to deploy a version of the application, wherein the version of the application comprises updates to the source code made based on the user performing a group of repetitive manual tasks comprising all the repetitive manual tasks before the final repetitive manual task, on the source code repository;
based on determining the pattern occurs with the frequency, generating, by the one or more processors, an automated delivery pipeline for the application, wherein the automated delivery pipeline automates the pattern, a final command of the automated delivery pipeline comprising a command to automatically deploy the application, wherein a version of the application deployed utilizing the automated delivery pipeline comprises updates to the source code automatically applied to the source code repository based on initiating the automated delivery pipeline; and
utilizing, by the one or more processors, the automated delivery pipeline to deliver a new version of the application.

2. The computer-implemented method of claim 1, wherein deploying the new version of the application comprises making the new version of the application available, as a service, to one or more users of the shared computing environment.

3. The computer-implemented method of claim 1, wherein the one or more resources of the shared computing environment are selected from a group consisting of: physical machines, virtual machines, and containers.

4. The computer-implemented method of claim 1, wherein identifying the one or more resources of the shared computing environment utilized in delivery of the application comprises:
obtaining, by the one or more processors, a request for an allocation of at least one resource for delivery of the application; and
based on the request, allocating, by the one or more processors, the one or more resources to the requestor.

5. The computer-implemented method of claim 1, wherein generating the automated delivery pipeline comprises:

generating, by the one or more processors, a configuration file; and
utilizing, by the one or more processors, the configuration file to generate the automated delivery pipeline.

6. The computer-implemented method of claim 1, wherein the delivery operations comprising the pattern comprise operations triggered by manual commands.

7. The computer-implemented method of claim 1, wherein the pattern comprises a predetermined number of updates to source code of the application.

8. A computer program product comprising:
a computer readable storage medium readable by one or more processors and storing instructions for execution by the one or more processors for performing a method comprising:
identifying, by the one or more processors, one or more resources of a shared computing environment utilized in delivery of an application, to users of the shared computing environment, wherein the one or more resources comprise a source code repository;
monitoring, by the one or more processors, communications to the one or more resources, to identify and intercept operations related to delivery of the application;
analyzing, by the one or more processors, the intercepted operations, to determine when the operations comprise a pattern occurring with a frequency indicative of a predetermined level of confidence, wherein the pattern comprises one or more manual tasks performed by a user of the source code repository comprising source code for the application, wherein the repetitive manual tasks are selected from the group consisting of: building the application, testing the application, and deploying the application, wherein a final repetitive manual task of the repetitive manual tasks comprising the pattern is a command to deploy a version of the application, wherein the version of the application comprises updates to the source code made based on the user performing a group of repetitive manual tasks comprising all the repetitive manual tasks before the final repetitive manual task, on the source code repository;
based on determining the pattern occurs with the frequency, generating, by the one or more processors, an automated delivery pipeline for the application, wherein the automated delivery pipeline automates the pattern, a final command of the automated delivery pipeline comprising a command to automatically deploy the application, wherein a version of the application deployed utilizing the automated delivery pipeline comprises updates to the source code automatically applied to the source code repository based on initiating the automated delivery pipeline; and
utilizing, by the one or more processors, the automated delivery pipeline to deliver a new version of the application.

9. The computer program product of claim 8, wherein deploying the new version of the application comprises making the new version of the application available, to one or more users of the shared computing environment.

10. The computer program product of claim 8, wherein the one or more resources of the shared computing environment are selected from a group consisting of: physical machines, virtual machines, and containers.

11. The computer program product of claim 8, wherein identifying the one or more resources of the shared computing environment utilized in delivery of the application comprises:
   obtaining, by the one or more processors, a request for an allocation of at least one resource for delivery of the application; and
   based on the request, allocating, by the one or more processors, the one or more resources to the requestor.

12. The computer program product of claim 8, wherein generating the automated delivery pipeline comprises:
   generating, by the one or more processors, a configuration file; and
   utilizing, by the one or more processors, the configuration file to generate the automated delivery pipeline.

13. The computer program product of claim 8, wherein the delivery operations comprising the pattern comprise operations triggered by manual commands.

14. A system comprising:
   a memory;
   one or more processors in communication with the memory; and
   program instructions executable by the one or more processors via the memory to perform a method, the method comprising:
      identifying, by the one or more processors, one or more resources of a shared computing environment utilized in delivery of an application, to users of the shared computing environment, wherein the one or more resources comprise a source code repository;
      monitoring, by the one or more processors, communications to the one or more resources, to identify and intercept operations related to delivery of the application;
      analyzing, by the one or more processors, the intercepted operations, to determine when the operations comprise a pattern occurring with a frequency indicative of a predetermined level of confidence, wherein the pattern comprises one or more manual tasks performed by a user of the source code repository comprising source code for the application, wherein the repetitive manual tasks are selected from the group consisting of: building the application, testing the application, and deploying the application, wherein a final repetitive manual task of the repetitive manual tasks comprising the pattern is a command to deploy a version of the application, wherein the version of the application comprises updates to the source code made based on the user performing a group of repetitive manual tasks comprising all the repetitive manual tasks before the final repetitive manual task, on the source code repository;
      based on determining the pattern occurs with the frequency, generating, by the one or more processors, an automated delivery pipeline for the application, wherein the automated delivery pipeline automates the pattern, a final command of the automated delivery pipeline comprising a command to automatically deploy the application, wherein a version of the application deployed utilizing the automated delivery pipeline comprises updates to the source code automatically applied to the source code repository based on initiating the automated delivery pipeline; and
      utilizing, by the one or more processors, the automated delivery pipeline to deliver a new version of the application.

* * * * *